(12) United States Patent
Mazzini et al.

(10) Patent No.: US 10,135,645 B1
(45) Date of Patent: Nov. 20, 2018

(54) EQUALIZER OPTIMIZATION FOR FEC-PROTECTED COMMUNICATION LINKS

(71) Applicant: Cisco Technology, Inc., San Jose, CA (US)

(72) Inventors: Marco Mazzini, Seville (ES); Alberto Cervasio, Cuorgne' Turin (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/787,239

(22) Filed: Oct. 18, 2017

(51) Int. Cl.
| | |
|---|---|
| H04B 10/00 | (2013.01) |
| H04L 25/03 | (2006.01) |
| H04B 10/079 | (2013.01) |
| H04B 10/40 | (2013.01) |
| H04L 1/00 | (2006.01) |
| H04L 1/20 | (2006.01) |
| H04B 10/54 | (2013.01) |
| H04B 10/69 | (2013.01) |

(52) U.S. Cl.
CPC . *H04L 25/03057* (2013.01); *H04B 10/07953* (2013.01); *H04B 10/40* (2013.01); *H04L 1/005* (2013.01); *H04L 1/203* (2013.01); *H04B 10/541* (2013.01); *H04B 10/6971* (2013.01); *H04L 2025/03611* (2013.01)

(58) Field of Classification Search
USPC ........................ 398/9–38, 202–214
See application file for complete search history.

(56) References Cited

U.S. PATENT DOCUMENTS

| | | | | |
|---|---|---|---|---|
| 6,366,613 | B2* | 4/2002 | Sommer | H03H 21/0012 333/28 R |
| 6,513,136 | B1* | 1/2003 | Barker | H04L 1/0045 375/224 |
| 6,829,297 | B2* | 12/2004 | Xia | H04L 1/0054 375/232 |
| 7,123,653 | B2* | 10/2006 | Kim | H04L 25/0305 375/232 |
| 7,130,344 | B2* | 10/2006 | Xia | H04L 1/0054 375/233 |
| 7,944,964 | B2* | 5/2011 | Lee | H04L 25/0307 375/231 |

(Continued)

OTHER PUBLICATIONS

Pete Anslow, "FEC performance with PAM4 on multi-part links," IEEE P802.3bs Task Force, Pittsburgh, PA, May 2015, 19 pages.

(Continued)

*Primary Examiner* — Agustin Bello
(74) *Attorney, Agent, or Firm* — Patterson + Sheridan, LLP

(57) ABSTRACT

A method is disclosed for configuring equalization circuitry of a communication device. The method comprises determining, for a predefined first value of a tap weight of a decision feedback equalizer (DFE) of the equalization circuitry, whether a predefined error propagation condition occurs. The method further comprises iteratively updating the tap weight according to a predefined scheme, wherein each update of the tap weight occurs responsive to determining that the predefined error propagation condition occurs for a current value of the tap weight. The method further comprises ceasing the updating of the tap weight responsive to determining a difference between two adjacent values of the tap weight is less than a predefined resolution limit.

20 Claims, 5 Drawing Sheets

(56) References Cited

U.S. PATENT DOCUMENTS

| | | | |
|---|---|---|---|
| 8,391,430 B2* | 3/2013 | Mihota | H04B 3/142 375/229 |
| 8,767,811 B2* | 7/2014 | Zhong | H04L 25/03343 375/229 |
| 9,614,699 B2* | 4/2017 | Iqbal | H04L 25/03057 |
| 9,806,917 B2* | 10/2017 | Norimatsu | H04L 25/03057 |
| 2001/0043650 A1* | 11/2001 | Sommer | H03H 21/0012 375/232 |
| 2002/0186762 A1* | 12/2002 | Xia | H04L 1/0054 375/232 |
| 2003/0048840 A1* | 3/2003 | Ling | H03H 21/0012 375/232 |
| 2003/0067974 A1* | 4/2003 | Haunstein | H04L 25/03038 375/229 |
| 2004/0017516 A1* | 1/2004 | Tsuie | H04L 25/03057 348/607 |
| 2004/0057535 A1* | 3/2004 | Strolle | H04H 20/28 375/340 |
| 2004/0091039 A1* | 5/2004 | Xia | H04L 1/0054 375/233 |
| 2006/0002462 A1* | 1/2006 | Park | H04L 25/03012 375/232 |
| 2006/0008279 A1* | 1/2006 | Chiang | H04B 10/6971 398/202 |
| 2006/0176948 A1* | 8/2006 | Lee | H04L 25/03057 375/233 |
| 2007/0133672 A1* | 6/2007 | Lee | H04L 25/0307 375/233 |
| 2007/0147850 A1* | 6/2007 | Savory | H04B 10/61 398/208 |
| 2007/0237263 A1* | 10/2007 | Strolle | H04H 20/28 375/321 |
| 2008/0205504 A1* | 8/2008 | Tsuie | H04L 25/03019 375/233 |
| 2010/0134256 A1* | 6/2010 | Mihota | H04B 3/142 340/10.1 |
| 2010/0177816 A1* | 7/2010 | Malipatil | H04L 25/03057 375/233 |
| 2013/0121396 A1* | 5/2013 | Huang | H04L 25/03057 375/233 |
| 2014/0029651 A1* | 1/2014 | Zhong | H04L 25/03343 375/219 |
| 2014/0064352 A1* | 3/2014 | Zhong | H04L 25/03038 375/233 |
| 2014/0161440 A1* | 6/2014 | Lindsay | H04B 10/66 398/16 |
| 2014/0341592 A1* | 11/2014 | Taylor | H04B 10/25133 398/159 |
| 2015/0131711 A1* | 5/2015 | Huang | H04L 25/03057 375/233 |
| 2015/0319017 A1* | 11/2015 | Huang | H04L 25/03057 375/233 |
| 2015/0333937 A1* | 11/2015 | Kusumoto | H04L 25/03057 375/233 |
| 2017/0019275 A1* | 1/2017 | Norimatsu | H04L 25/03 |

OTHER PUBLICATIONS

Raj Fledge & Magesh Valliappan, "TX Differential Precoder for 50Gb/s Electrical Links," IEEE 802.3 50G/NGOATH Study Group, Whistler, Canada, May 2016. 12 pages.

Sudeep Bhoja, Will Bliss, Chung Chen, Vasu Parthasarathy, John Wang and Zhongfeng Wang, "Preceding proposal for PAM4 modulation," IEEE 802.3, Chicago, Sep. 2011. 11 pages.

* cited by examiner

EQUALIZER OPTIMIZATION FOR FEC-PROTECTED COMMUNICATION LINKS

TECHNICAL FIELD

Embodiments presented in this disclosure generally relate to high-speed communications systems, and more specifically, techniques for improved communication performance while preventing error propagation conditions.

BACKGROUND

Increasing bandwidth of communications systems has led to the introduction of new modulation formats such as four-level pulse amplitude modulation (PAM-4), and the introduction of forward error correction (FEC)-protected links into new communications standards such as Institute of Electrical and Electronics Engineers (IEEE) 802.3bs and 802.3cd.

Whether signals are communicated over electrical or optical links having FEC protection, error propagation conditions can occur at certain tap values for decision feedback equalizer (DFE) circuitry in the receiver chain of the communications systems. The error propagation conditions can be relatively severe for PAM-4 signals when compared with non-return-to-zero (NRZ) binary signals. For example, equivalent DFE tap weights that are greater than 0.5 can cause the error distribution statistics to change from a random mode to a burst mode.

One possible solution for mitigating or preventing burst mode errors includes controlling an error limit of an input signal (i.e., before applying FEC) to be less than a predefined error limit. Another possible solution includes a single DFE tap into an equalizer chain at the optical receiver. In some cases, the DFE tap may be bypassed and/or may be limited to a certain maximum value, e.g., using appropriate firmware control settings. While these solutions can be effective to mitigate or prevent burst mode errors, the performance of the communications system may be limited unnecessarily.

Because the maximum value of the DFE tap will depend on the error limit of the input signal, the error propagation condition can depend on the actual channel configuration. Additionally, channel variations can occur over time due to environmental conditions and/or aging, but this is generally less influential than the channel configuration.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is a method for configuring equalization circuitry of a communication device. The method comprises determining, for a predefined first value of a tap weight of a decision feedback equalizer (DFE) of the equalization circuitry, whether a predefined error propagation condition occurs. The method further comprises iteratively updating the tap weight according to a predefined scheme, wherein each update of the tap weight occurs responsive to determining that the predefined error propagation condition occurs for a current value of the tap weight. The method further comprises ceasing the updating of the tap weight responsive to determining a difference between two adjacent values of the tap weight is less than a predefined resolution limit.

Another embodiment presented in this disclosure is a communication device comprising decision feedback equalizer (DFE) circuitry and logic operable to: determine, for a predefined first value of a tap weight of the DFE circuitry, whether a predefined error propagation condition occurs. The logic is further operable to iteratively update the tap weight according to a predefined scheme, wherein each update of the tap weight occurs responsive to determining that the predefined error propagation condition occurs for a current value of the tap weight. The logic is further operable to cease the updating of the tap weight responsive to determining a difference between two adjacent values of the tap weight is less than a predefined resolution limit.

Example Embodiments

Embodiments discussed herein are directed to techniques for setting optimal DFE weights within a communications system depending on a determined link condition. The techniques are especially beneficial for 'borderline' links (i.e., operating close to the BER limit), which may experience a margin improvement by a fine adjustment of the DFE weight. The techniques allow previously-set DFE tap weights to be adaptively updated closer to optimal values, and to continue being updated using feedback to mitigate the likelihood of an error propagation condition occurring. The techniques may further include monitoring for variations in link conditions, and activating the adaptive updating as needed.

Figure 1:
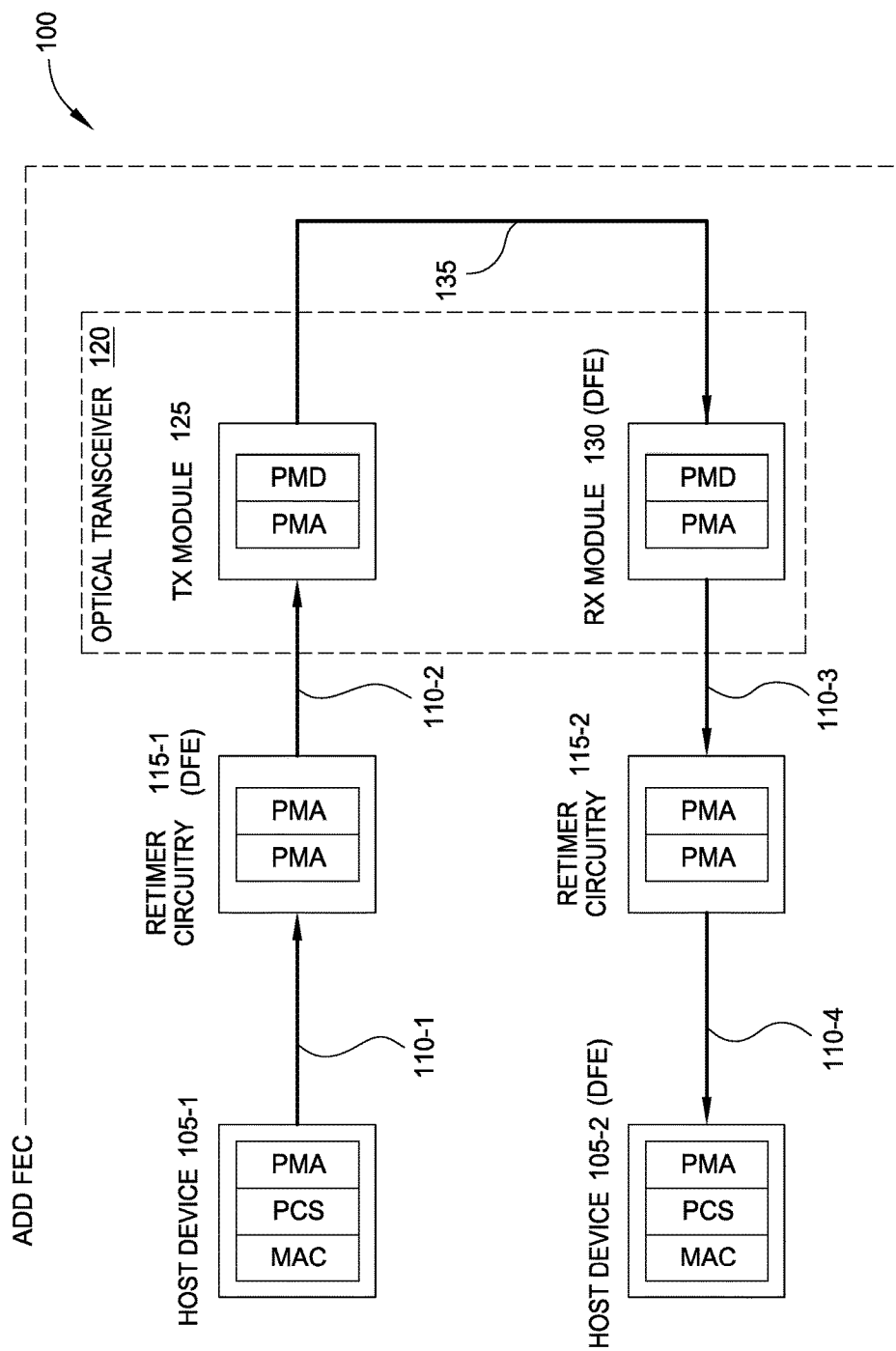
FIG. 1 illustrates an exemplary communication system including a plurality of DFEs, according to embodiments disclosed herein.

FIG. 1 illustrates a communication system 100 including a plurality of DFEs, according to embodiments disclosed herein. The communication system 100 may have any suitable implementation, such as a plurality of remote networked computing devices. In one embodiment, the communication system 100 includes a multilayer converged transport network element providing packet switching and optical switching functionalities.

As illustrated, the communication system 100 includes a first host device 105-1 and a second host device 105-2. The first host device 105-1 and the second host device 105-2 may each be implemented as a computing element having any suitable form. In some embodiments, the first host device 105-1 and the second host device 105-2 each support high-speed Ethernet communications with data rates of 400 gigabits per second (Gb/s) or greater. However, it will be noted that any other suitable data rates may be possible using the techniques discussed herein. As shown, the first host device 105-1 and the second host device 105-2 may each interface with the media access control (MAC) layer, and the physical coding sublayer (PCS) and physical medium attachment sublayer (PMA) of the physical layer (PHY).

The first host device 105-1 is connected via a first electrical link 110-1 to an optical transceiver 120, and is configured to transmit forward error correction (FEC)-encoded electrical signals to a first retimer circuitry 115-1 using the first electrical link 110-1. The optical transceiver 120 comprises retimer circuitry and its optical transmitter (Tx) module 125 is coupled with the first retimer circuitry 115-1 via a second electrical link 110-2. The retimer circuitry of the optical Tx module 125 may interface with the PMA sublayer and the physical medium dependent (PMD) sublayer of the physical layer.

The optical transceiver 120 further comprises an optical receiver (Rx) module 130, which comprises retimer circuitry and is coupled with the optical Tx module 125 via an optical link 135. The Rx module 130 of optical transceiver 120 is coupled with first host retimer circuitry 115-2 via a third electrical link 110-3. The optical Rx module 130 may interface with the PMA sublayer and the PMD sublayer. In some embodiments, the Rx module 130 includes DFE circuitry. The optical transceiver 120 is coupled with the second host device 105-2 via a fourth electrical link 110-4.

Although disclosed as a single optical transceiver 120 having both an optical Tx module 125 and an optical Rx module 130, alternate implementations may include separate optical Tx and Rx modules.

In some embodiments, the first electrical link 110-1 represents a chip-to-chip (C2C) link between the first host device 105-1 and the retimer circuitry 115-1, and the fourth electrical link 110-4 represents a C2C link between the retimer circuitry 115-2 and the second host device 105-2. The second electrical link 110-2 and the third electrical link 110-3 may each represent a chip-to-module (C2M) link. DFE functionality may be implemented in conjunction with each of the C2C links, such that, in addition to DFE circuitry implemented in the optical Rx module 130, one or both of the retimer circuitry 115-1 and the second host device 105-2 may also include DFE circuitry.

In some embodiments, a precoding and decoding functionality may be implemented in one or more of the C2C links, the C2M links, and the optical link 135. The precoding and decoding functionality generally reduces the impact of error propagation within the communication system 100, by re-distributing errors to be more random (e.g., a one-tap DFE burst error runs into 2 errors per event). In other words, when an error propagation condition occurs, the precoding and decoding functionality improves signal-to-noise (SNR) requirements to achieve an equivalent BER.

Each of the electrical links 110-1, 110-2, 110-3, 110-4 may comprise one or more conductors. In some cases, each of the electrical links 110-1, 110-2, 110-3, 110-4 comprises a plurality of channels (or lanes). In one embodiment, each of the electrical links 110-1, 110-2, 110-3, 110-4 is configured to support 400GAUI-8, providing a 400 Gb/s data rate using 8 lanes. Other data rate and lane combinations are also possible. The communication system 100 may be configured to communicate modulated signals on the electrical links 110-1, 110-2, 110-3, 110-4. In one embodiment, the electrical links 110-1, 110-2, 110-3, 110-4 are configured to carry 4-level pulse amplitude modulation (PAM-4) signals. In some embodiments, along the communication path defined using the electrical links 110-1, 110-2, 110-3, 110-4 and/or the optical link 135 of the communication system 100, FEC is applied beginning at the first host device 105-1 ("Add FEC") and the FEC is removed (or "terminated") at the second host device 105-2 ("Remove FEC").

In some embodiments, a plurality of individual components of the communication system 100 includes equalizer circuitry that provides a DFE functionality. As shown, the retimer circuitry 115-1, the Rx module 130, and the second host device 105-2 each provide a respective DFE functionality, although other combinations of components are also possible.

When providing a plurality of DFE stages over FEC-protected electrical links 110-1, 110-2, 110-3, 110-4 and/or optical link 135, it is possible for a predefined error propagation condition to occur where a random bit error results in a burst of errors being propagated through the communication system 100. The error propagation condition may be particularly severe for certain types of signal modulation, such as PAM-4 when compared with non-return-to-zero (NRZ) modulation. In some cases, a DFE tap weight that is greater than 0.5 can cause the errors to transition from a random mode to a burst mode.

In some embodiments, the risk of the error propagation condition is reduced by limiting the error rate of an input signal (e.g., bit error rate (BER)) prior to applying FEC in the communication system 100. In some embodiments, error rate limiting is used in conjunction with one or more DFE taps that are included within the communication system 100. The one or more DFE taps may be bypassed and/or coerced (i.e., forced) to a maximum allowed value (or tap weight) using control settings, e.g., implemented in firmware. While the bypass or coercion can be effective to avoid the error propagation condition, such a static coercion of the DFE circuitry can limit the overall performance of the communication system 100. This is largely because the maximum allowed tap weight is based on the input BER, such that error propagation will depend on the actual channel configuration.

Further, the channel itself may vary over time due to environmental and/or aging conditions, although channel variations will often have a lesser impact than the channel configuration. In some cases, channel variations are assumed to be relatively slow in time and substantially linear. Assuming an acceptable decay rate, is it possible that the DFE tap values may be coerced differently depending on the input BER. The decay rate will also depend on current link topology.

Therefore, it may be beneficial to adaptively determine DFE tap weights depending on the link condition. This can be especially beneficial for such 'borderline' links operating very close to a predefined BER limit, where the links may experience a margin improvement responsive to a fine adjustment of the DFE tap weights.

Techniques are herein disclosed for adaptively determining values for a previously coerced DFE tap. The adaptively determined values may approach an optimal value, and may receive feedback to ensure that a predefined error propagation condition does not occur.

Figure 2:
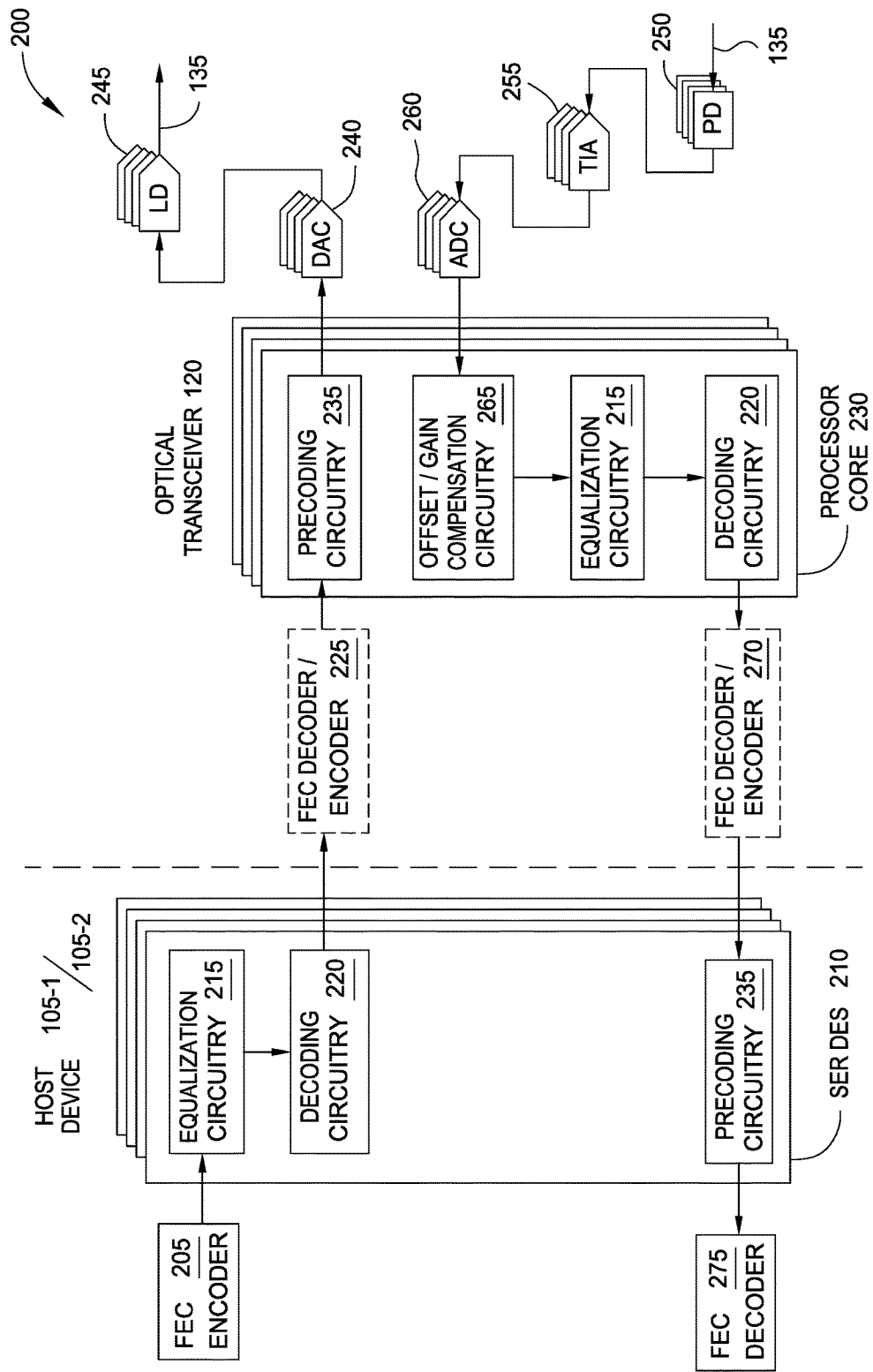
FIG. 2 is a block diagram of an exemplary communication system, according to embodiments disclosed herein.

FIG. 2 is a block diagram 200 of an exemplary communication system, according to embodiments disclosed herein. The block diagram 200 may be representative of one or more implementations of the communication system 100 of FIG. 1.

In an implementation of a communication system (e.g., supporting 400GBASE communications), along a transmit path of the communication system, a FEC encoder 205 provides FEC-encoded signals to one or more serializer/deserializers (SerDes) 210 of the host device 105-1, 105-2. In one embodiment, the FEC encoder 205 provides signals to the SerDes 210 according to 400GAUI-8 (i.e., providing a 400 Gb/s data rate using 8 lanes). In such a case, each lane may correspond to a 50 Gb/s data rate (or 25 GBaud for PAM-4 signaling). In some embodiments, the signals are processed, using equalization circuitry 215 and/or decoding circuitry 220 of each SerDes 210, prior to being transmitted to the optical transceiver 120.

In some embodiments, the optical transceiver 120 processes the received signals using a FEC decoder/encoder 225 prior to being received at one or more processor cores 230. In some embodiments, each processor core 230 comprises precoding circuitry 235. The signals output from the processor core 230 are received by one or more digital-to-analog converters (DACs) 240. One or more laser diodes (LDs) 245 receive the output from the one or more DACs 240 and are configured to transmit optical signals onto an optical link 135. In one embodiment, the optical link 135 supports a 100 Gb/s transmit data rate (or 50 GBaud for PAM-4) on each of 4 lanes.

Along a receive path of the communication system, optical signals are received at one or more photodetectors (PDs) 250 coupled with the optical link 135. In one embodiment, the optical link 135 supports a 50 GBaud receive data rate using 4 lanes. The output signals from the one or more PDs 250 are provided to one or more transimpedance amplifiers (TIAs) 255 and then to one or more analog-to-digital converters (ADCs) 260. The output signals from the one or more ADCs 260 may be processed at one or more of offset/gain compensation circuitry 265, equalization circuitry 215, and decoding circuitry 220 of the one or more processor cores 230. Signals output from the processor core 230 (e.g., from the decoding circuitry 220) may be received by a FEC decoder/encoder 270 of the optical transceiver 120 before being transmitted to the host device 105-1, 105-2. The host device 105-1, 105-2 may further comprise precoding circuitry 235 in the SerDes 210, and/or a FEC decoder 275.

The block diagram 200 may represent two categories of implementations of the system 100. In a first category, the communication system supports PHY with FEC termination. In the first category, a DFE tap may be included in the equalization circuitry 215 of the processor core 230. The processor core 230 may be configured to bypass the DFE and/or set the DFE tap weight. The optical transceiver 120 may be configured to monitor one or more of: a SNR after equalization is performed on the received signals, error rates (BER and/or frame error rate (FER)) corresponding to each lane, a BER/FER ratio, and the DFE tap weight. In this way, BER and FER values may be determined at one or more of the FEC decoder/encoder 225, the FEC decoder/encoder 270, and the FEC decoder 275.

In one alternate implementation of a first category communication system (e.g., supporting 100GBASE-FR communications), the SerDes 210 receives electrical signals according to CAUI-4 (i.e., a 100 Gb/s data rate using 4 lanes). The equalization circuitry 215 and decoding circuitry 220 of the SerDes 210 may be omitted. A FEC encoder may be substituted for the FEC decoder/encoder 225. The precoding circuitry 235 of the processor core 230 may be omitted, and the FEC-encoded signals are provided to the one or more DACs 240 and the LDs 245. In one embodiment, the optical link 135 supports a 100 Gb/s data rate (or 50 GBaud for PAM-4) using a single lane. Further, along the receive path, the decoding circuitry 220 may be omitted and a FEC decoder may be substituted for the FEC decoder/encoder 270. The BER and FER values may be determined at the FEC decoder along the receive path.

In a second category, the communication system does not support PHY with FEC termination. In such an implementation, the FEC decoder/encoder 225 and the FEC decoder/encoder 270 may be omitted, such that the FEC encoder 205 and the FEC decoder 275 provide FEC protection to all of the electrical and optical links of the communication system.

In the second category, a DFE tap may be included in the equalization circuitry 215 of the processor core 230. The processor core 230 and/or the host device 105-1, 105-2 may be configured to bypass the DFE and/or set the DFE tap weight. The optical transceiver 120 and/or the host device 105-1, 105-2 may be configured to monitor one or more of: a SNR after equalization is performed on the received signals, and the DFE tap weight. The host device 105-1 may further be configured to monitor one or more of: error rates (BER and/or frame error rate (FER)) corresponding to each lane, and a BER/FER ratio.

Whether the communication system corresponds to the first category or to the second category, the decoding circuitry 220 and precoding circuitry 235 of the SerDes 210 and the processor core 230 are optional components of the block diagram 200.

Figure 3:
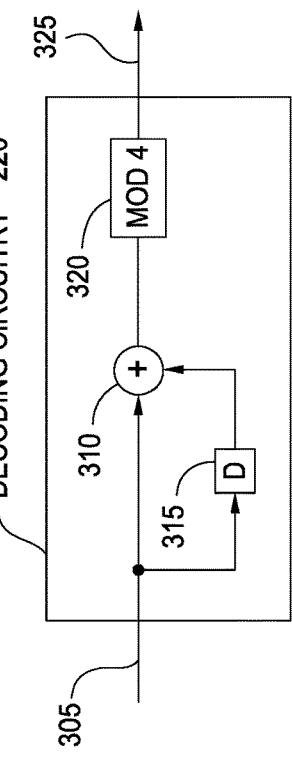
FIG. 3 illustrates an exemplary implementation of decoding circuitry, according to embodiments disclosed herein.

FIG. 3 illustrates an exemplary implementation of decoding circuitry 220, according to embodiments disclosed herein. The decoding circuitry 220 is configured to receive an input signal on an input port 305, which is coupled with a first input of a summing block 310 and an input of a delay block 315. The output of the delay block 315 is coupled with a second input of the summing block 310. The output of the summing block 310 is coupled with an input of a modulo (mod) 4 block 320. The output of the mod 4 block 320 is coupled with an output port 325 of the decoding circuitry 220. Other suitable implementations of the decoding circuitry 220 are also possible.

Figure 4:
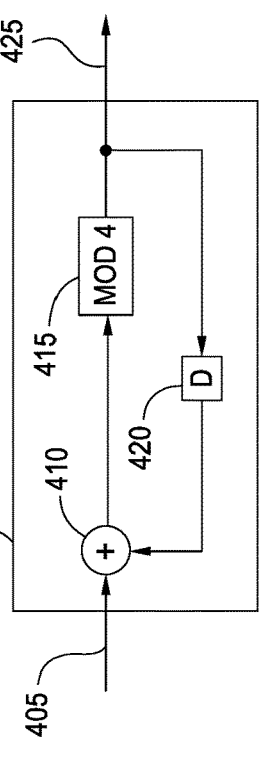
FIG. 4 illustrates an exemplary implementation of precoding circuitry, according to embodiments disclosed herein.

FIG. 4 illustrates an exemplary implementation of precoding circuitry 235, according to embodiments disclosed herein. The precoding circuitry 235 is configured to receive an input signal on an input port 405, which is coupled with a first input of a summing block 410. An output of the summing block 410 is coupled with an input of a mod 4 block 415. An output of the mod 4 block 415 is coupled with an output port 425 of the precoding circuitry 235, as well as an input of a delay block 420. An output of the delay block 420 is coupled with a second input of the summing block 410. Other suitable implementations of the precoding circuitry 235 are also possible.

Figure 5:
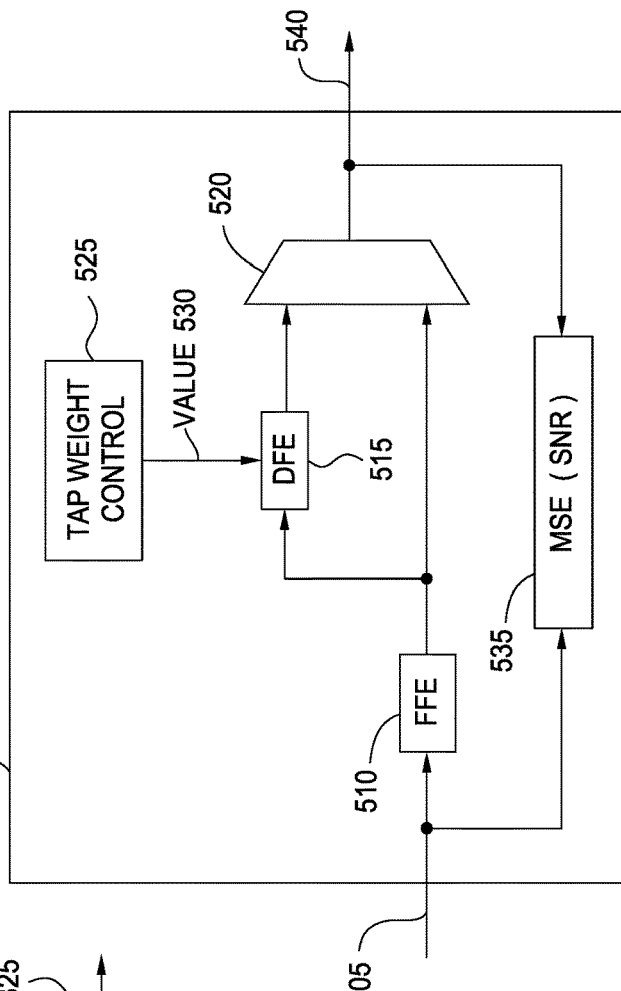
FIG. 5 illustrates an exemplary implementation of equalization circuitry, according to embodiments disclosed herein.

FIG. 5 illustrates an exemplary implementation of equalization circuitry 215, according to embodiments disclosed herein. The equalization circuitry 215 is configured to receive an input signal on an input port 505, which is coupled with an input of a feed-forward equalizer (FFE) block 510. An output of the FFE block 510 is coupled with a DFE block 515 and with a multiplexer 520. The DFE block 515 is coupled with a tap weight control block 525 configured to provide a tap weight value 530 for the DFE block 515. An output of the multiplexer 520 is coupled with an output port 540. The output port 540 and the input port 505 are coupled with a measurement block 535 configured to determine a SNR of the equalized signal based on a mean squared error (MSE) calculation. Alternately, the measurement block 535 may be implemented external to the equalization circuitry 215. Other suitable implementations of the equalization circuitry 215 are also possible.

Figure 6A:
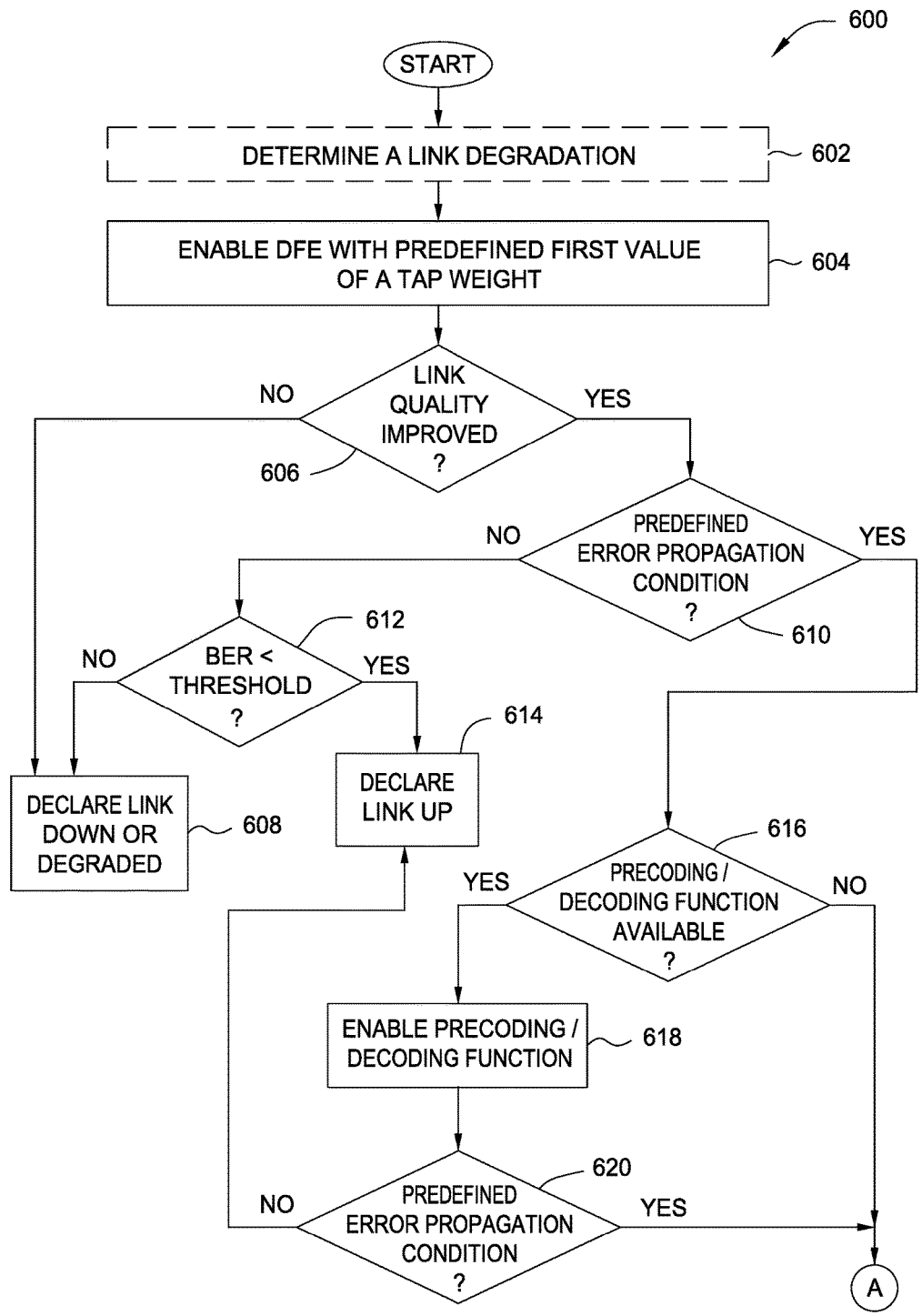
FIGS. 6A and 6B illustrate a method for configuring receiver circuitry having a DFE, according to embodiments disclosed herein.
Figure 6B:
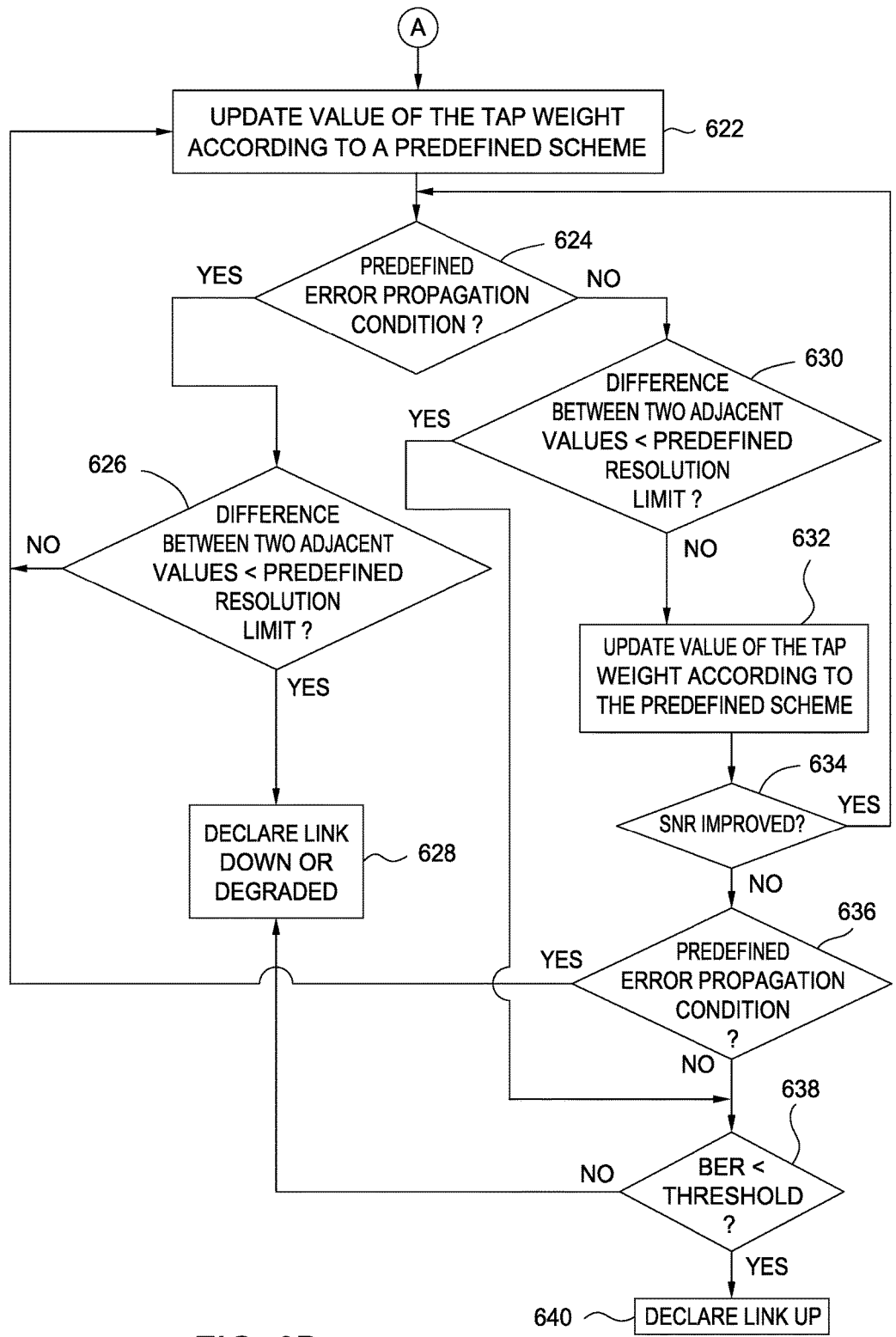

FIGS. 6A and 6B illustrate a method 600 for configuring receiver circuitry having a DFE, according to embodiments disclosed herein. The method 600 may be used in conjunction with other embodiments discussed herein, such as being performed using the optical transceiver 120 of FIG. 1.

The method 600 may have one or more preconditions. In one embodiment, the communication link is already established, any precoding and decoding functionality is off, the DFE tap is off and not coerced to a particular value. In some cases, link quality measurements such as BER, FER, and/or SNR may be continuously monitored in parallel with the various blocks of the method 600, such that one or more quality measurements may be acquired responsive to some or all of the individual blocks.

Method 600 optionally begins at block 602, where the optical transceiver determines that the communication link has been degraded. The determination may include one or more of: determining that the BER or the FER is greater than a corresponding threshold value, and determining that the SNR is less than a minimum value.

At block 604, the optical transceiver enables DFE with a predefined first value of a tap weight of the DFE. At block 606, the optical transceiver determines whether the link quality has improved by enabling the DFE. If the link quality has not improved ("NO"), the method 600 proceeds to block 608 and the link is declared "down" or "degraded". If the link quality has improved ("YES"), the method 600 proceeds to block 610 and the optical transceiver determines whether a predefined error propagation condition occurs. In some embodiments, the predefined error propagation condition occurs when a ratio of the FER and BER measurements is less than a predefined value (e.g., (FER/BER)<0.5).

If the predefined error propagation condition does not occur ("NO"), the method 600 proceeds to block 612 and the optical transceiver determines whether the BER is less than a threshold BER value. If the BER is not less than the threshold BER value ("NO"), the method 600 proceeds to block 608. If the BER is less than the threshold BER value ("YES"), the method 600 proceeds to block 614 and the optical transceiver declares the link "up".

If the predefined error propagation condition does occur ("YES"), the method 600 proceeds to block 616 and the optical transceiver determines whether a precoding and decoding function is available. Occurrence of the predefined error propagation condition can indicate that the link is set properly, but that the DFE tap weight is too large. If the precoding and decoding function is available ("YES"), the method 600 proceeds to enable the precoding and decoding function at block 618. At block 620, the optical transceiver determines whether the predefined error propagation condition occurs. If the condition does not occur ("NO"), the method 600 proceeds to block 614. If the condition occurs ("YES"), the method 600 proceeds to block 622. Additionally, if the precoding and decoding function is not available at block 616, the method 600 proceeds to block 622.

At block 622, the optical transceiver iteratively updates the value of the tap weight according to a predefined scheme. In one embodiment, the predefined scheme comprises a binary search scheme. At block 624, the optical transceiver determines whether the predefined error propagation condition occurs. If the condition occurs ("YES"), the method 600 proceeds to block 626 and the optical transceiver determines whether the difference between two adjacent values of the tap weight is less than a predefined resolution limit. If the difference is not less than the predefined resolution limit ("NO"), the method 600 proceeds to block 622. If the difference is less than the predefined resolution limit ("YES"), the method 600 proceeds to block 628 and the link is declared "down" or "degraded".

If the predefined error propagation condition does not occur at block 624 ("NO"), the method 600 proceeds to block 630 and the optical transceiver determines whether the difference between two adjacent values of the tap weight is less than a predefined resolution limit. If the difference is less than the predefined resolution limit ("YES"), the method 600 proceeds to block 638 and the optical transceiver determines whether the BER is less than the threshold BER value. If the BER is less than the threshold BER value ("YES"), the method 600 proceeds to block 640 and the link is declared "up". If the BER is not less than the threshold BER value ("NO"), the method 600 proceeds to block 628.

If, at block 630, the difference is not less than the predefined resolution limit ("NO"), the method 600 proceeds to block 632 and the optical transceiver updates the value of the tap weight according to the predefined scheme. At block 634, the optical transceiver acquires a SNR measurement responsive to updating the value of the tap weight, and determines whether the SNR measurement has improved from an immediately preceding SNR measurement. If the SNR has improved ("YES"), the method 600 proceeds to block 624. In some cases, the optical transceiver also determines at block 634 whether the improvement in the SNR has reached a minimum threshold value. The minimum threshold value may be a predefined value representing a suitable point at which the DFE tap weight value need not be further updated (e.g., insignificant improvement may be expected with further updates to the tap weight value).

If the SNR has not improved ("NO"), the method 600 proceeds to block 636 and the optical transceiver determines whether the predefined error propagation condition occurs. If the condition occurs ("YES"), the method 600 proceeds to block 622. If the condition does not occur ("NO"), the method 600 proceeds to block 638. The method 600 generally ends after the link has been declared "up", "down", or "degraded", such as following completion of one of blocks 608, 614, 628, and 640.

In one non-limiting example of traversing the method 600, assume that an established communication link has a $5 \times 10^{-5}$ BER value and the threshold BER value is $1 \times 10^{-5}$. Assume also that the maximum DFE tap value that avoids error propagation is 0.56. Assume also that the DFE tap-setting granularity (i.e., the predefined resolution limit described in blocks 626, 630) is 0.02. However, any threshold values, observation times, FER/BER ratios, DFE granularity values, etc. may be set to any other suitable values.

The BER value should be lowered to less than the threshold BER value (block 602). The DFE when enabled has a predefined first value of 0.8 (block 604). Assume that the SNR increases and/or the BER is reduced by enabling the DFE (block 606), but that the predefined error propagation condition occurs at the 0.8 tap weight value (e.g., a burst of errors are detected after a BER/FER ratio measurement) (block 610).

Assuming that the precoding and decoding function is not available (block 616), the tap weight value is updated according to a predefined scheme (block 622). For example, for a first tap weight value update, $X_n=X_{n-1}/2$ (here, 0.8/2=0.4). A SNR measurement may be acquired responsive to the updated tap weight value.

Assuming that the predefined error propagation condition does not occur (block 624), the optical transceiver determines whether a difference between two adjacent values of the tap weight is less than a predefined resolution limit. In this case, the difference between the two adjacent values is (0.8−0.4=0.4), which is greater than the predefined resolution limit of 0.02. The optical transceiver updates the tap weight value according to the predefined scheme (block 632).

To improve the overall performance of the optical transceiver, the tap weight value may be increased when the error propagation condition does not occur. Conversely, the tap weight value may be decreased when the error propagation occurs. For example, for subsequent tap weight value updates when the error propagation condition does not occur, the tap weight value may be updated according to $X_n=X_{n-1}+ABS((X_{n-1}-X_{n-2})/2)$, where ABS represents an absolute value function. When the error propagation condition occurs, the tap weight value may be updated according to $X_n=X_{n-1}-ABS((X_{n-1}-X_{n-2})/2)$. In this case, we assume that the error propagation condition does not occur, and the updated tap weight value is 0.6 (0.4+ABS((0.4−0.8)/2)=0.6).

At the updated tap weight value of 0.6, another SNR measurement may be acquired, and assuming that the SNR improves from a immediately preceding SNR value (block 634), the optical transceiver determines whether the predefined error propagation condition occurs (block 624). Assume that the predefined error propagation condition occurs (tap weight of 0.6>0.56). Using the predefined scheme, successive iterations of the tap weight values are 0.5, 0.55, 0.575, 0.563, 0.556, and so forth. At the tap weight value of 0.556, the predefined error propagation condition does not occur and the predefined resolution limit has been met, and the optical transceiver determines whether the BER value is less than the threshold BER value (block 638). Assuming that the BER value is less than the threshold BER value, the communication link is declared "up" and the method 600 ends.

Thus, embodiments disclosed herein provide an algorithm in which poor quality communication links can be improved without causing a predefined error propagation condition to occur. After detecting a burst of errors, the optical transceiver may quickly converge quickly to a final DFE tap weight value to improve performance of the communication links. In some cases, the algorithm may be used to monitor for variations of the link condition, such that the dynamic updating of the DFE tap weight value may be activated whenever is needed.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for configuring equalization circuitry of a communication device, the method comprising:
   determining, for a predefined first value of a tap weight of a decision feedback equalizer (DFE) of the equalization circuitry, whether a predefined error propagation condition occurs;
   iteratively updating the tap weight according to a predefined scheme, wherein each update of the tap weight occurs responsive to determining that the predefined error propagation condition occurs for a current value of the tap weight; and
   ceasing the updating of the tap weight responsive to determining a difference between two adjacent values of the tap weight is less than a predefined resolution limit.

2. The method of claim 1, wherein the predefined scheme comprises a binary search scheme.

3. The method of claim 1, further comprising:
   enabling a precoding and decoding function responsive to determining that the predefined error propagation condition occurs for the first value of the tap weight; and
   determining again whether the predefined error propagation condition occurs responsive to enabling the precoding and decoding function.

4. The method of claim 1, further comprising:
   acquiring a signal-to-noise ratio (SNR) measurement responsive to each update of the tap weight; and
   performing at least one update of the tap weight responsive to determining that (i) the difference between two adjacent values of the tap weight is greater than the predefined resolution limit, and (ii) a current SNR measurement for the current value of the tap weight is greater than an immediately preceding SNR measurement.

5. The method of claim 1, further comprising:
   determining, responsive to ceasing the updating of the tap weight, whether a bit error rate is less than a threshold value.

6. The method of claim 5, further comprising one of:
   when the bit error rate is not less than the threshold value, declaring a communication link of the communication device down or degraded; and
   when the bit error rate is less than the threshold value, declaring the communication link up.

7. The method of claim 1, further comprising:
   responsive to determining a degradation of a communication link of the communication device, enabling the DFE with the predefined first value of the tap weight.

8. The method of claim 7, further comprising:
   determining, prior to determining whether the predefined error propagation condition occurs, whether a quality of the communication link improves responsive to enabling the DFE with the predefined first value of the tap weight.

9. The method of claim 1, wherein determining that the predefined error propagation condition occurs comprises:
   determining that a ratio of a bit error rate to a frame error rate exceeds a predefined value.

10. The method of claim 1, wherein the communication device comprises an optical transceiver configured to transmit four-level pulse amplitude modulation (PAM-4) optical signals.

11. A communication device comprising:
    decision feedback equalizer (DFE) circuitry; and
    logic operable to:
        determine, for a predefined first value of a tap weight of the DFE circuitry, whether a predefined error propagation condition occurs;
        iteratively update the tap weight according to a predefined scheme, wherein each update of the tap weight occurs responsive to determining that the predefined error propagation condition occurs for a current value of the tap weight; and
        cease the updating of the tap weight responsive to determining a difference between two adjacent values of the tap weight is less than a predefined resolution limit.

12. The communication device of claim 11, wherein the predefined scheme comprises a binary search scheme.

13. The communication device of claim 11, wherein the logic is further operable to:
    enable a precoding and decoding function responsive to determining that the predefined error propagation condition occurs for the first value of the tap weight; and
    determine again whether the predefined error propagation condition occurs responsive to enabling the precoding and decoding function.

14. The communication device of claim 11, wherein the logic is further operable to:
    acquire a signal-to-noise ratio (SNR) measurement responsive to each update of the tap weight; and
    perform at least one update of the tap weight responsive to determining that (i) the difference between two adjacent values of the tap weight is greater than the predefined resolution limit, and (ii) a current SNR measurement for the current value of the tap weight is greater than an immediately preceding SNR measurement.

15. The communication device of claim 11, wherein the logic is further operable to:
    determine, responsive to ceasing the updating of the tap weight, whether a bit error rate is less than a threshold value.

16. The communication device of claim 15, further comprising a communication link, the logic further operable to perform one of:
    when the bit error rate is not less than the threshold value, declare the communication link down or degraded; and
    when the bit error rate is less than the threshold value, declare the communication link up.

17. The communication device of claim 11, further comprising a communication link, the logic further operable to:
    responsive to determining a degradation of the communication link, enable the DFE with the predefined first value of the tap weight.

18. The communication device of claim 17, the logic further operable to:
    determine, prior to determining whether the predefined error propagation condition occurs, whether a quality of the communication link improves responsive to enabling the DFE with the predefined first value of the tap weight.

19. The communication device of claim 11, wherein the logic operable to determine that the predefined error propagation condition occurs comprises:
    logic operable to determine that a ratio of a bit error rate to a frame error rate exceeds a predefined value.

20. The communication device of claim 11, further comprising an optical transceiver configured to transmit four-level pulse amplitude modulation (PAM-4) optical signals.

* * * * *